US012795298B2

(12) United States Patent
Therkelsen

(10) Patent No.: US 12,795,298 B2
(45) Date of Patent: Nov. 10, 2026

(54) GAIN CONTROL OF BEAMS OF MICROPHONE ARRAY AND EXTERNAL MICROPHONE IN A VIDEOCONFERENCE

(71) Applicant: Cisco Technology, Inc., San Jose, CA (US)

(72) Inventor: Asbjorn Therkelsen, Nesbru (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 109 days.

(21) Appl. No.: 18/800,390

(22) Filed: Aug. 12, 2024

(65) Prior Publication Data

US 2026/0046558 A1 Feb. 12, 2026

(51) Int. Cl.
*H04R 3/00* (2006.01)
*G06F 3/16* (2006.01)
*G06T 7/70* (2017.01)
*H04R 1/40* (2006.01)

(52) U.S. Cl.
CPC ............ *H04R 3/005* (2013.01); *G06F 3/162* (2013.01); *G06T 7/70* (2017.01); *H04R 1/406* (2013.01); *G06T 2207/30201* (2013.01); *H04R 2430/01* (2013.01)

(58) Field of Classification Search
None
See application file for complete search history.

(56) References Cited

U.S. PATENT DOCUMENTS 5,335,011 A * 8/1994 Addeo .................. H04R 1/406 348/E7.083
6,449,593 B1 * 9/2002 Valve .................... H04R 3/005 704/233
7,586,513 B2 9/2009 Muren et al.
8,218,831 B2 7/2012 Tian et al.
8,848,030 B2 9/2014 Solvang
9,307,200 B2 4/2016 Aarrestad et al.
9,633,270 B1 4/2017 Tangeland et al.
9,686,605 B2 6/2017 Sun
(Continued)

FOREIGN PATENT DOCUMENTS

CN 113163148 A 7/2021
WO WO-2004039123 A1 * 5/2004 ............ H04R 5/027

OTHER PUBLICATIONS

ClearOne: "ClearOne's BMA 360 Camera-Tracking Demo", YouTube, retrieved from https://www.youtube.com/watch?v=YZtZbjryRfo, Jan. 14, 2022, 2 Pages.
(Continued)

*Primary Examiner* — Brian T Pendleton
(74) *Attorney, Agent, or Firm* — Edell, Shapiro & Finnan, LLC

(57) ABSTRACT

A method to control audio in a videoconference. The method includes operating a videoconference session with a videoconference endpoint that is configured to pick up audio via (i) a plurality of beams associated with a microphone array and (ii) at least one external microphone, determining a position of a talking participant in the videoconference session, and in response to the position of the talking participant being further away from the videoconference endpoint than a position of the at least one external microphone, reducing a gain for a selected beam of the plurality of beams in favor of a gain for the at least one external microphone.

20 Claims, 5 Drawing Sheets

(56) References Cited

U.S. PATENT DOCUMENTS

| | | | | |
|---|---|---|---|---|
| 11,128,793 | B2 | 9/2021 | Therkelsen et al. | |
| 11,589,005 | B1 * | 2/2023 | Liu | H04L 65/403 |
| 11,706,562 | B2 * | 7/2023 | Grinnip, III | H04R 29/005 381/92 |
| 11,765,498 | B2 * | 9/2023 | Rollow, IV | H04R 1/406 381/92 |
| 12,452,584 | B2 * | 10/2025 | Marash | H04R 1/406 |
| 12,456,469 | B1 * | 10/2025 | Ganguly | G10L 25/60 |
| 12,519,438 | B2 * | 1/2026 | Veselinovic | H03G 3/24 |
| 2004/0013252 | A1 * | 1/2004 | Craner | H04M 1/247 379/142.01 |
| 2011/0096915 | A1 * | 4/2011 | Nemer | H04M 3/568 379/158 |
| 2012/0327177 | A1 | 12/2012 | Kee et al. | |
| 2014/0003635 | A1 * | 1/2014 | Mohammad | H04R 3/005 381/306 |
| 2015/0078582 | A1 * | 3/2015 | Graham | H04R 31/006 381/92 |
| 2021/0266409 | A1 | 8/2021 | Enteshari et al. | |
| 2022/0392478 | A1 | 12/2022 | Hijazi et al. | |
| 2023/0290370 | A1 * | 9/2023 | Therkelsen | H04R 5/04 |
| 2023/0353966 | A1 | 11/2023 | Balch Barth et al. | |
| 2025/0348267 | A1 * | 11/2025 | Chambers | G06F 3/16 |
| 2026/0011337 | A1 * | 1/2026 | Usher | G10L 21/0232 |
| 2026/0032396 | A1 * | 1/2026 | Mamidwar | H04R 29/00 |

OTHER PUBLICATIONS

Poly: "Poly Studio Acoustic Fence Demo", YouTube, retrieved from https://www.youtube.com/watch?V=SgpOgup1w_4, Jul. 24, 2019, 3 Pages.

Talantzis F., et al., "Audio-Visual Active Speaker Tracking in Cluttered Indoors Environments", IEEE Transactions on Systems, Man, and Cybernetics—Part B: Cybernetics, vol. 39, No. 1, Feb. 2009, pp. 7-15.

* cited by examiner

GAIN CONTROL OF BEAMS OF MICROPHONE ARRAY AND EXTERNAL MICROPHONE IN A VIDEOCONFERENCE

TECHNICAL FIELD

The present disclosure relates to enhancing audio quality during a videoconference.

BACKGROUND

A video collaboration endpoint (or "videoconference endpoint" or, more simply, "video endpoint") is an electronic device that allows a user to engage in a video teleconference (or "videoconference") with one or more remote users, often via one or more conferencing servers and additional video endpoints. A video endpoint may include several components to help facilitate a session or videoconference, the components including one or more cameras, loudspeakers, microphones, displays, etc. Video endpoints are often utilized in professional (e.g., enterprise) settings, such as in formal conference rooms, although they have recently found increased use in home environments as well.

Some video endpoints include a microphone array that can be configured to "listen" to, or to pick up, audio via a plurality of microphone "beams" or directionally focused zones or patterns. Further, these same video endpoints may also be configured to support external microphones that can be placed on a conference table of a meeting or conference room. When mixing the audio from the microphone beams together with audio from the external microphones, the result can be reduced overall audio quality, especially if a talking meeting participant is located far from both the microphone array and a given external microphone.

DETAILED DESCRIPTION

Overview

Figure 1:
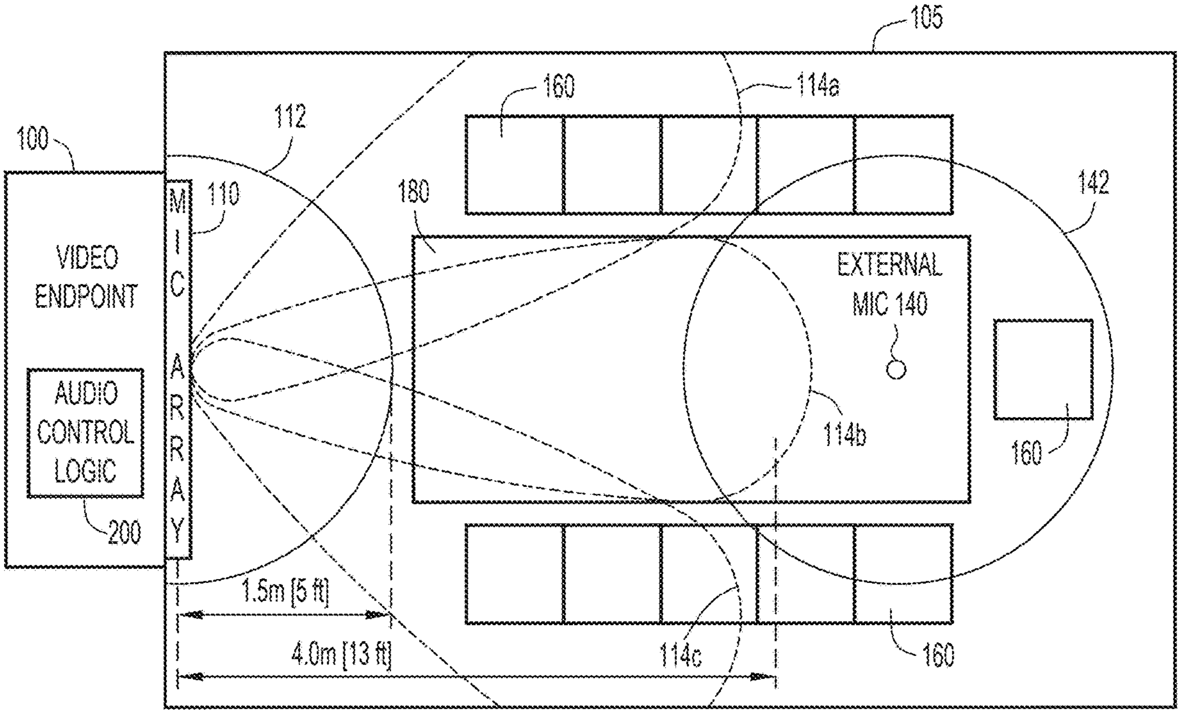
FIG. 1 shows an arrangement including a video endpoint that supports both a microphone array for beamforming and external microphones, and that operates with audio control, according to an example embodiment.

A method to control audio in a videoconference. The method includes operating a videoconference session with a videoconference endpoint that is configured to pick up audio via (i) a plurality of beams supported by (associated with) a microphone array and (ii) at least one external microphone, determining a position of a talking participant in the videoconference session, and in response to the position of the talking participant being further away from the videoconference endpoint than a position of the at least one external microphone, reducing a gain for a selected beam of the plurality of beams in favor of a gain for the at least one external microphone.

A device is also described and includes an interface configured to enable network communications, a memory, and one or more processors coupled to the interface and the memory, and configured to: operate a videoconference session with a videoconference endpoint that is configured to pick up audio via (i) a plurality of beams supported by (associated with) a microphone array and (ii) at least one external microphone, determine a position of a talking participant in the videoconference session, and in response to the position of the talking participant being further away from the videoconference endpoint than a position of the at least one external microphone, reduce a gain for a selected beam of the plurality of beams in favor of a gain for the at least one external microphone.

Example Embodiments

Some video endpoints include a microphone array that can be configured to "listen" to, or to pick up, audio via a plurality of microphone beams. Further, these same video endpoints may also be configured to support external microphones that can be placed on a conference table of a meeting or conference room. When mixing the audio from the microphone beams together with audio from the external microphones, the result can be reduced overall audio quality, especially if a talking meeting participant is located far from both the microphone array and a given external microphone.

Reduced audio quality may result from a number of different issues. For example, one issue is that different external microphones (such as from different vendors) may have different sensitivities. Another issue is that meeting rooms may be configured with different shapes and sizes and, as such, a distance to a given external microphone can vary significantly from one venue to another. This makes it difficult to design a suitable automatic audio input mixer for all meeting rooms. Yet another issue is that audio picked up from one or more of the beams often has a different sound quality compared to the audio picked up from an external microphone on a table. If a mixer within the video endpoint alternates mixing between these two sources, the result can be a varying sound that can be disturbing for remote listeners.

The embodiments described herein can address these issues by providing an automated approach to controlling which combination or proportion of audio, namely that being picked up by a beam versus that being picked up by an external microphone, is passed to a remote video endpoint and/or remote participant.

Reference is now made to FIG. 1, which shows a conference room 105 including a video endpoint 100 that supports a microphone array 110 on a front face thereof for beamforming and an external microphone 140, and that operates with audio control logic 200, according to an example embodiment. Microphone array 110 may include two or more microphone elements and provides a near field audio pick up zone 112 (which, as indicated in the figure, may have a range on the order of 1.5 meters, or 5 feet), as well as, in this example, three separate audio pick up beams, beam 114*a*, beam 114*b*, and beam 114*c*. Each of these beams may have an operational distance of, for example, approximately 4 meters, or 13 feet, as indicated.

External microphone (mic) 140 may have an omnidirectional, or generally circular, pick up pattern 142. Several external microphones may be used, but FIG. 1 only shows a single one, which may be considered the closest one to video endpoint 100. As shown, there may be overlap between the pick up pattern 142 of the external microphone 140 and at least one of beam 114*a*, beam 114*b*, and beam 114*c* of the microphone array. Several seating locations 160 are shown around a conference table 180. The video endpoint 100 also typically includes one or more display screens (not shown in FIG. 1) that face outward towards the conference table in order to display video captured from one or more remote locations during a video conference.

As will be explained below, audio control logic 200 is configured to determine a location of external microphone 140, and more specifically, the closest such microphone to video endpoint 100, as well as a location of a speaking participant in a video conference, and to use that information to adjust a level of audio received from one of the beams that is supplied or transmitted to a remote participant. At a high level, audio control logic 200 may use received audio and video to create a model of where the meeting participants are located and where the closest external microphone is located. Audio control logic 200 may then use that model to reduce the range (or gain) of one or more of beam 114*a*, beam 114*b*, and beam 114*c* from the microphone array 110 if the speaking participant is not closer to the video endpoint 100 than the closest external microphone, here external microphone 140.

Figure 2:
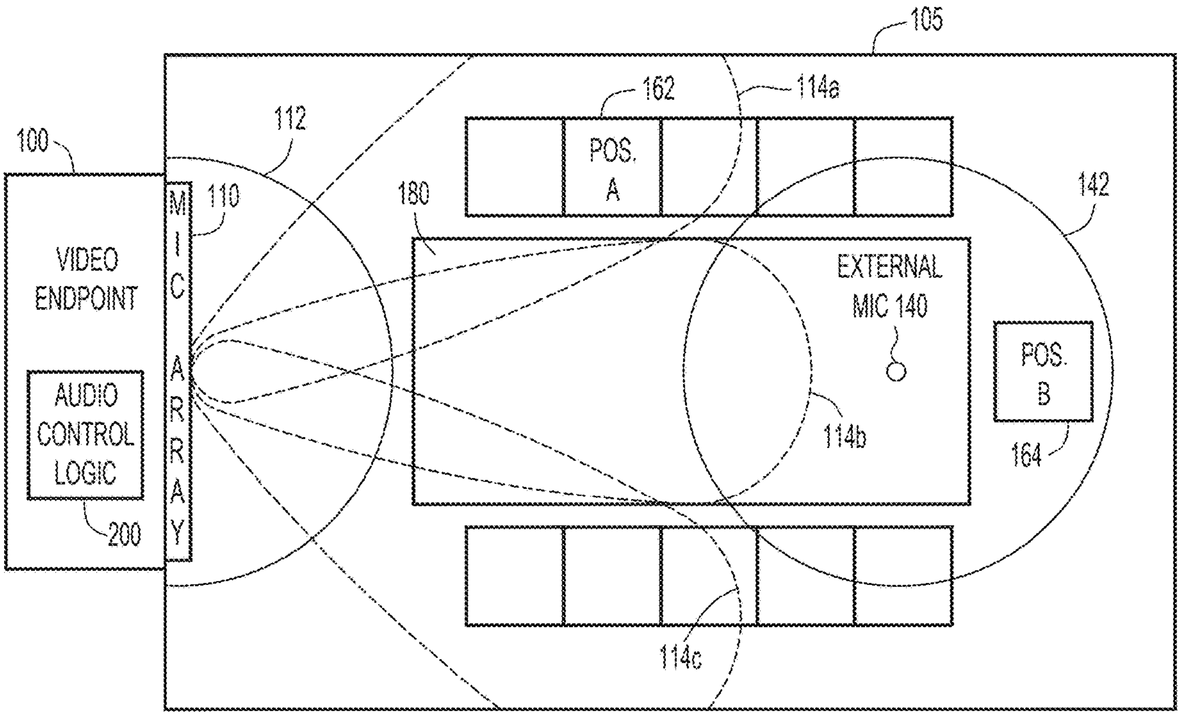
FIG. 2 is similar to FIG. 1, but also illustrates how audio control handles audio generated at different locations in a conference room, according to an example embodiment.

Reference is now made to FIG. 2, which is similar to FIG. 1, but also illustrates how audio control logic 200 treats audio generated at different locations in conference room 105, according to an example embodiment. As noted, audio control logic 200 is, according to an embodiment, configured to control an audio mixer using information regarding where a closest external microphone, such as external microphone 140, is located relative to a speaking meeting participant at, for example, Position A 162 and Position B 164. Based on this acquired information, audio control logic 200 may be configured to reduce the range (or relative gain) of one or more of beam 114*a*, beam 114*b*, and beam 114*c*, and thus generate audio that has less variation (dynamics, etc.) when heard by a remote participant.

In accordance with an embodiment, several steps may be executed by audio control logic 200, with the first step being an initialization or setup step. In this first step, audio control logic 200 is configured to estimate the distance from the video endpoint 100 to a closest external microphone, i.e., external microphone 140, by measuring a delay difference between the external microphone 140 and one or more microphones in the microphone array 110. This measurement can be executed by playing sound through, for example, one or more built-in loudspeakers in video endpoint 100, and then determining timing differences to find the relative position of each external microphone, including external microphone 140. Alternative approaches include executing an installation wizard during which the position of each external microphone is stored in the system, or to perform a configuration and store the distance to the closest external microphone.

In a second step, and during a video conference session, audio control logic 200 may be configured to, using a camera of the video endpoint, perform head detection and estimate the distance to each meeting participant based on, for example, a machine learning (ML) module or other process, using, for example, the detected head size to determine a distance.

In a third step, and also performed during a video conference session and simultaneous to the second step, if a location of a speaking meeting participant is determined to be further away from the closest external microphone, i.e., external microphone 140, a mixer may be controlled to reduce the use (that is gain) of beam 114*a*, beam 114*b*, and/or beam 114*c*.

Participant speaker tracking may be employed to estimate the angle and the distance to a speaker, based also on audio, and such information can be used to select/identify which of the detected meeting participants is speaking at any given moment. That is, audio control logic 200 may be configured to detect an angle of arrival of audio using microphone array 110, and that angle of arrival may be used to augment, refine, or confirm the model that includes the seating location of the speaking participant.

Figure 3:
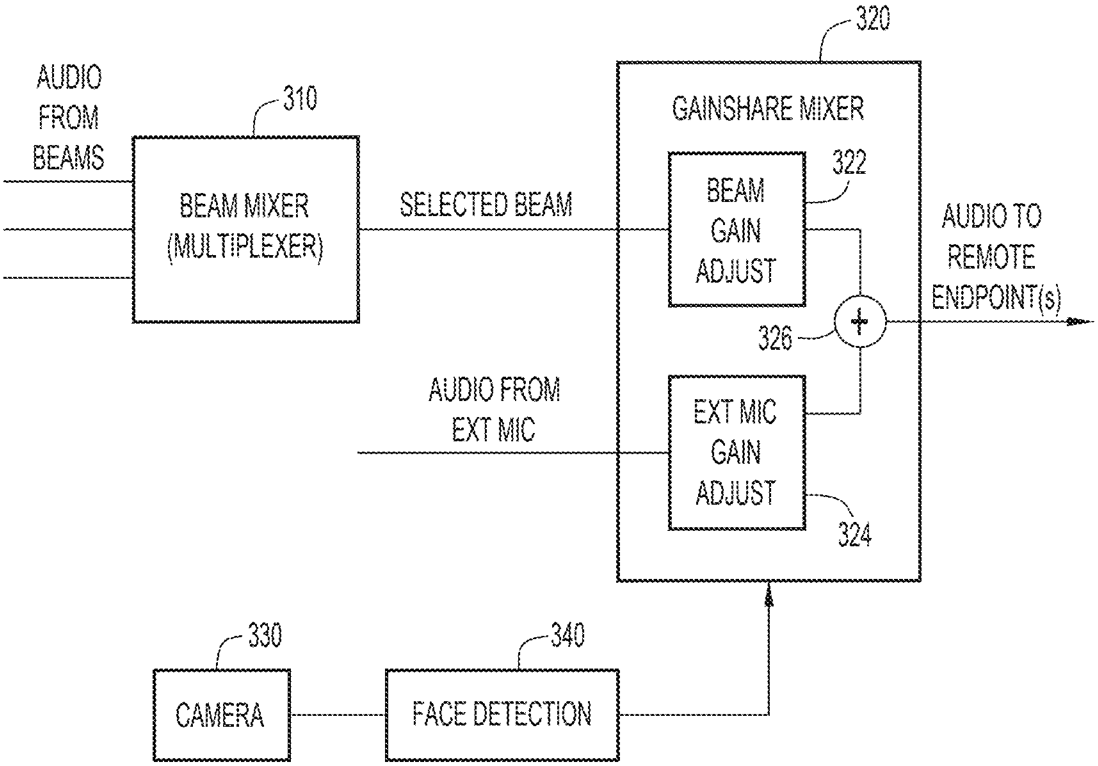
FIG. 3 is a block diagram of functions of the audio control, according to an example embodiment.

FIG. 3 is a block diagram of functions of at least portions of audio control logic 200, according to an example embodiment. As shown, a beam mixer 310 is connected to a gainshare mixer 320. Beam mixer 310 is configured to receive audio from each of, e.g., beam 114*a*, beam 114*b*, and/or beam 114*c* and select signals from one of the beams to pass to gainshare mixer 320. In this respect, beam mixer 310 could be implemented as a beam selector or multiplexer. Signals from a given selected beam are passed or fed to gainshare mixer 320, particularly to beam gain adjustment module 322. At the same time, audio signals from, e.g., external microphone 140 are supplied or fed to external microphone gain adjustment module 324. Outputs of each of the beam gain adjustment module 322 and the external microphone gain adjustment module 324 are provided to summing node 326. A camera 330 of video endpoint 100 supplies images to a face detection module 340, an output of which is supplied to gainshare mixer 320, which is configured, in response to the output of face detection module 340, and possibly also information regarding the angle of arrival of audio from a speaking participant, to control the respective proportions (gains) of audio signals received from beam mixer 310 and external microphone 140 that are passed to remote endpoints. Face detection module 340 may operate based on machine learning or other techniques. The signal processing performed for the operations depicted in FIG. 3 may be done by software executed by a processor in the video endpoint unit 100, after the audio signals are converted to digital signals if the microphones are analog microphones. On the other hand, such analog-to-digital conversion may not be necessary when the microphones employ digital or optical micro-electromechanical systems (MEMS) technology, to output digital audio signals.

Reference is now made to both FIG. 2 and FIG. 3. Consider a scenario in which external microphone 140 is placed so close to video endpoint 100 that the range of at least beam 114*b* overlaps with the pick up pattern 142 of external microphone 140. In this scenario, if the speaking participant is sitting at Position B 164, audio control logic 200 is configured to control gainshare mixer 320 such that audio from external microphone 140 is mostly or exclusively passed to remote endpoints. That is, using face detection module 340 (and possibly audio angle of arrival), the speaking participant at Position B 164 is detected to be further away than external microphone 140, and as such, the audio from beam 114*b* is reduced or not used (i.e., its gain is reduced or even set to zero) in the audio mix. On the other hand, if a speaking participant is at Position A 162, that participant is detected to be closer to the video endpoint 100 than external microphone 140 and, as such, audio control logic 200 may be configured to reduce or zero out the gain of audio picked up by external microphone 140 in favor of audio picked up by beam 114*a*. As a further optimization, face detection module 340 can also determine that the speaking participant at Position A 162 is talking while facing towards the video endpoint 100, in which case the audio from external microphone 140 may be zeroed out, i.e., its gain set to zero (or close to zero) such that only (or mostly only) audio from beam 114*a* is sent to remote endpoints. Likewise, face detection module 340 may determine that the speaking participant at Position A 162 is talking while facing toward external microphone 140, and audio control logic 200 may therefore control gainshare mixer 320 to have more balanced relative gains for the audio signals received from each of, for example, beam 114*a* and external microphone 140.

In sum, the embodiments described herein provide a system and approach that dynamically changes the range (i.e., gain) of beams of a microphone array so that it is possible to control (i.e., reduce or even eliminate) the overlap between a given beam and a pick up zone of a closest external microphone based on the distance to the closest external microphone and the position of a speaking meeting participant relative to the closest external microphone.

Figure 4:
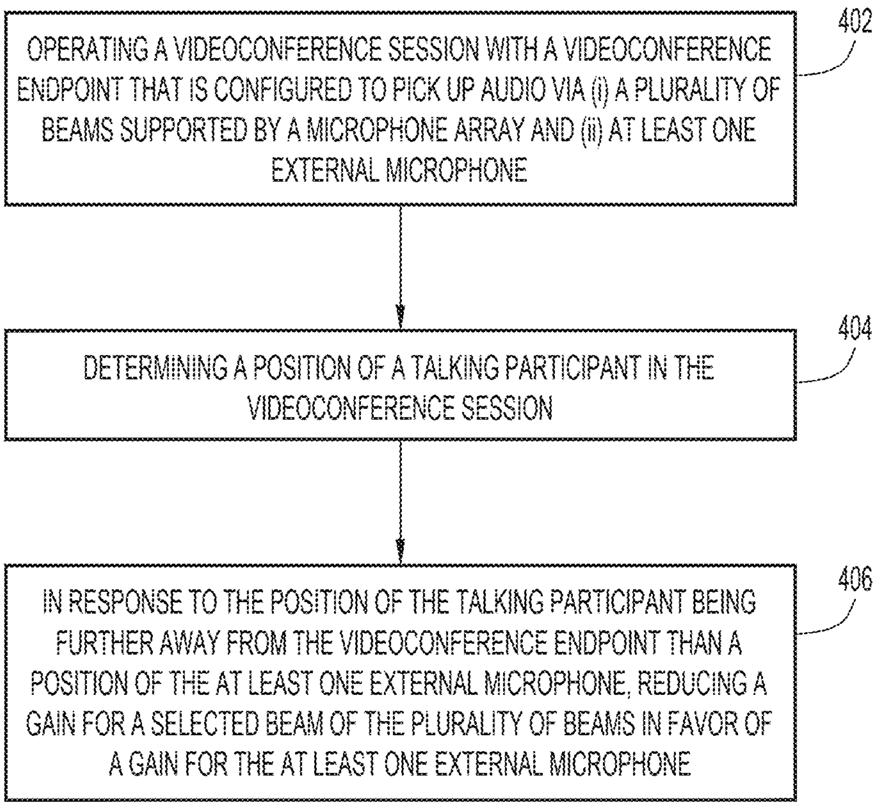
FIG. 4 is a flowchart depicting a series of steps that may be executed by an audio control method, according to an example embodiment.

FIG. 4 is a flowchart depicting a series of steps that may be executed by audio control logic 200, according to an example embodiment. As shown, at 402 an operation may be configured to operate a videoconference session with a videoconference endpoint that is configured to pick up audio via (i) a plurality of beams supported by (associated with) a microphone array and (ii) at least one external microphone. At 404, an operation may be configured to determine a position of a talking participant in the videoconference session. At 406, an operation may be configured, in response to the position of the talking participant being further away from the videoconference endpoint than a position of the at least one external microphone, to reduce a gain for a selected beam of the plurality of beams in favor of a gain for the at least one external microphone.

As described herein, the position of the at least one external microphone may be closest to the videoconference endpoint among any other external microphones that are in communication with the videoconference endpoint.

The method 400 may further include eliminating overlap between respective audio pick up zones of the selected beam of the plurality of beams and the at least one external microphone.

The method 400 may further include determining the position of the at least one external microphone prior to operating the videoconference session.

The method 400 may further include feeding audio signals from the selected beam of the plurality of beams to a first gain adjustment module, feeding audio signals from the at least one external microphone to a second gain adjustment module, and summing respective outputs of the first gain adjustment module and the second gain adjustment module.

The method 400 may further include determining the position of the talking participant based on a face detection process (which may use machine learning or other techniques).

As described above, the method 400 may further include controlling the gain for the selected beam of the plurality of beams and the gain for the at least one external microphone based on the machine learning-based face detection.

Further, the method 400 may further include determining the position of the talking participant using an angle of arrival/direction of arrival of audio from the talking participant.

Further still, the method 400 may further include zeroing out the gain of the selected beam of the plurality of beams.

The method 400 may further include generating a model of the position of the at least one external microphone with respect to a position of the videoconference endpoint and the position of the talking participant.

Figure 5:
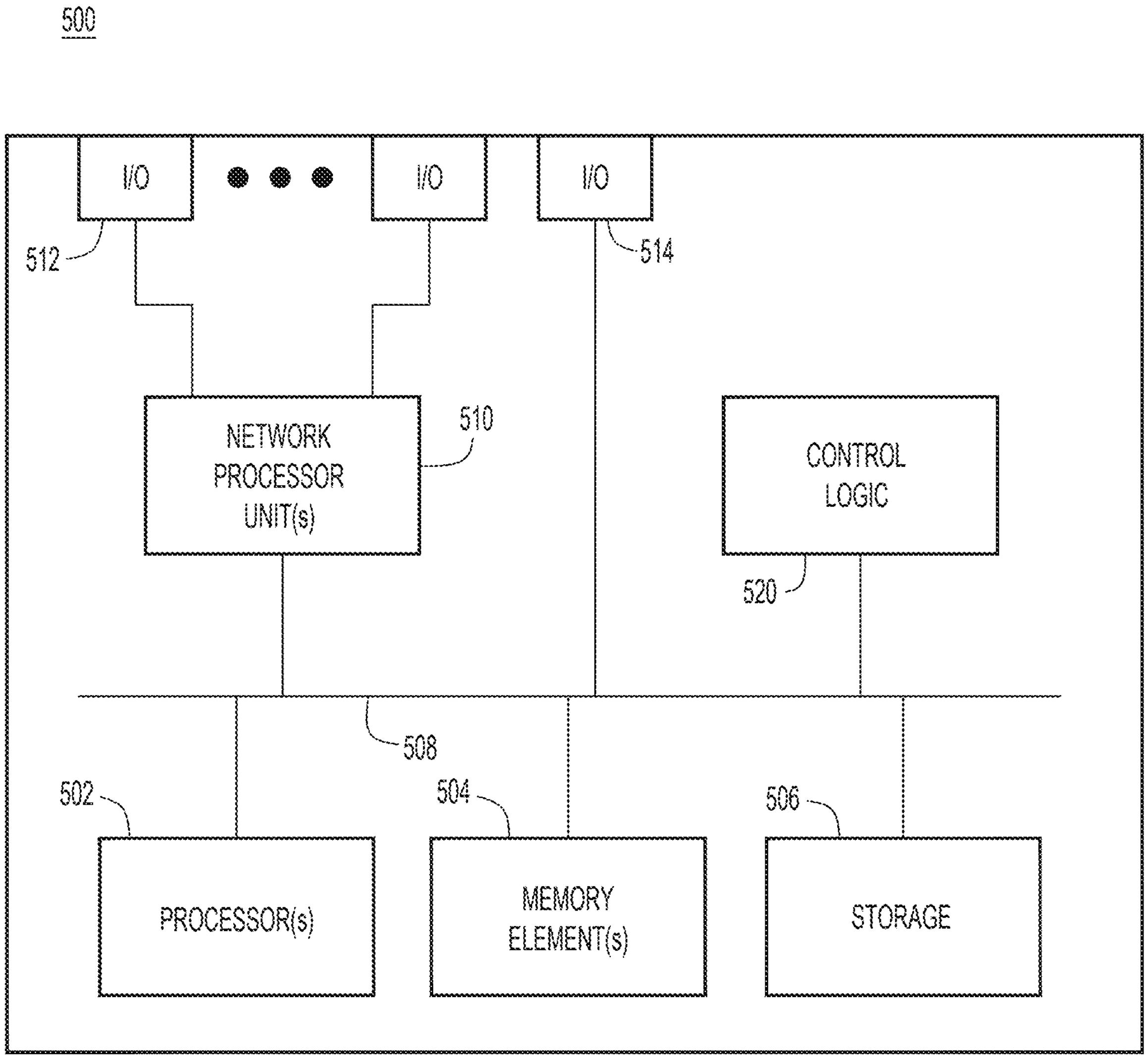
FIG. 5 is a block diagram of a computing device that may be configured to host audio control logic, such as a video endpoint, and to perform audio control related techniques described herein, according to an example embodiment.

FIG. 5 is a block diagram of a computing device that may be configured to host audio control logic, such as, a video conference endpoint, and to perform techniques described herein, according to an example embodiment. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless/receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

In sum, a method may include operating a videoconference session with a videoconference endpoint that is configured to pick up audio via (i) a plurality of beams supported by (associated with) a microphone array and (ii) at least one external microphone, determining a position of a talking participant in the videoconference session, and in response to the position of the talking participant being further away from the videoconference endpoint than a position of the at least one external microphone, reducing a gain for a selected beam of the plurality of beams in favor of a gain for the at least one external microphone.

In the method, the position of the at least one external microphone is closest to the videoconference endpoint among any other external microphones that are in communication with the videoconference endpoint.

The method may further include eliminating overlap between respective audio pick up zones of the selected beam of the plurality of beams and the at least one external microphone.

The method may further include determining the position of the at least one external microphone prior to operating the videoconference session.

The method may further include feeding audio signals from the selected beam of the plurality of beams to a first gain adjustment module, feeding audio signals from the at least one external microphone to a second gain adjustment module, and summing respective outputs of the first gain adjustment module and the second gain adjustment module.

The method may further include determining the position of the talking participant based on machine learning-based face detection.

The method may further include controlling the gain for the selected beam of the plurality of beams and the gain for the at least one external microphone based on the machine learning-based face detection.

The method may further include determining the position of the talking participant using an angle of arrival of audio from the talking participant.

The method may further include zeroing out the gain of the selected beam of the plurality of beams.

The method may further include generating a model of the position of the at least one external microphone with respect to a position of the videoconference endpoint and the position of the talking participant.

In another embodiment, a device may be provided and may include an interface configured to enable network communications, a memory, and one or more processors coupled to the interface and the memory, and configured to: operate a videoconference session with a videoconference endpoint that is configured to pick up audio via (i) a plurality of beams supported by (associated with) a microphone array and (ii) at least one external microphone, determine a position of a talking participant in the videoconference session, and in response to the position of the talking participant being further away from the videoconference endpoint than a position of the at least one external microphone, reduce a gain for a selected beam of the plurality of beams in favor of a gain for the at least one external microphone.

In the device, the position of the at least one external microphone is closest to the videoconference endpoint among any other external microphones that are in communication with the videoconference endpoint.

In the device, the one or more processors may be configured to eliminate overlap between respective audio pick up zones of the selected beam of the plurality of beams and the at least one external microphone.

In the device, the one or more processors may be further configured to determine the position of the at least one external microphone prior to operating the videoconference session.

In the device, the one or more processors may be further configured to feed audio signals from the selected beam of the plurality of beams to a first gain adjustment module, feed audio signals from the at least one external microphone to a second gain adjustment module, and sum respective outputs of the first gain adjustment module and the second gain adjustment module.

In the device, the one or more processors may be further configured to determine the position of the talking participant based on machine learning-based face detection.

In the device, the one or more processors may be further configured to control the gain for the selected beam of the plurality of beams and the gain for the at least one external microphone based on the machine learning-based face detection.

In yet another embodiment, one or more non-transitory computer readable storage media encoded with instructions are provided and that, when executed by a processor, cause the processor to: operate a videoconference session with a videoconference endpoint that is configured to pick up audio via (i) a plurality of beams supported by (associated with) a microphone array and (ii) at least one external microphone, determine a position of a talking participant in the videoconference session, and in response to the position of the talking participant being further away from the videoconference endpoint than a position of the at least one external microphone, reduce a gain for a selected beam of the plurality of beams in favor of a gain for the at least one external microphone.

In execution of the instructions, the position of the at least one external microphone is closest to the videoconference endpoint among any other external microphones that are in communication with the videoconference endpoint.

The instructions may be configured to eliminate overlap between respective audio pick up zones of the selected beam of the plurality of beams and the at least one external microphone.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

operating a videoconference session with a videoconference endpoint that is configured to pick up audio via (i) a plurality of beams associated with a microphone array and (ii) at least one external microphone;

determining a position of a talking participant in the videoconference session;

determining a position of the at least one external microphone relative to the videoconference endpoint; and in response to the position of the talking participant being further away from the videoconference endpoint than a position of the at least one external microphone, controlling a mixer to reduce a gain applied to audio signals from a selected beam from the plurality of beams and to adjust a gain applied to audio signals from the at least one external microphone.

2. The method of claim 1, wherein the position of the at least one external microphone is closest to the videoconference endpoint among any other external microphones that are in communication with the videoconference endpoint.

3. The method of claim 1, further comprising eliminating overlap between respective audio pick up zones of the selected beam of the plurality of beams and the at least one external microphone.

4. The method of claim 1, further comprising determining the position of the at least one external microphone prior to operating the videoconference session.

5. The method of claim 1, further comprising feeding audio signals from the selected beam of the plurality of beams to a first gain adjustment module, feeding audio signals from the at least one external microphone to a second gain adjustment module, and summing respective outputs of the first gain adjustment module and the second gain adjustment module.

6. The method of claim 1, further comprising determining the position of the talking participant based on a face detection process.

7. The method of claim 6, further comprising controlling the gain for the selected beam of the plurality of beams and the gain for the at least one external microphone based on machine learning-based face detection.

8. The method of claim 1, further comprising determining the position of the talking participant using an angle of arrival of audio from the talking participant.

9. The method of claim 1, further comprising zeroing out the gain of the selected beam of the plurality of beams.

10. The method of claim 1, further comprising generating a model of the position of the at least one external microphone with respect to a position of the videoconference endpoint and the position of the talking participant.

11. A device comprising:

an interface configured to enable network communications;

a memory; and one or more processors coupled to the interface and the memory, and configured to:

operate a videoconference session with a videoconference endpoint that is configured to pick up audio via (i) a plurality of beams associated with a microphone array and (ii) at least one external microphone;

determine a position of a talking participant in the videoconference session;

determine a position of the at least one external microphone relative to the videoconference endpoint; and in response to the position of the talking participant being further away from the videoconference endpoint than a position of the at least one external microphone, control a mixer to reduce a gain applied to audio signals from a selected beam from the plurality of beams and to adjust a gain applied to audio signals from the at least one external microphone.

12. The device of claim 11, wherein the position of the at least one external microphone is closest to the videoconference endpoint among any other external microphones that are in communication with the videoconference endpoint.

13. The device of claim 11, wherein the one or more processors are configured to eliminate overlap between respective audio pick up zones of the selected beam of the plurality of beams and the at least one external microphone.

14. The device of claim 11, wherein the one or more processors are further configured to determine the position of the at least one external microphone prior to operating the videoconference session.

15. The device of claim 11, wherein the one or more processors are further configured to feed audio signals from the selected beam of the plurality of beams to a first gain adjustment module, feed audio signals from the at least one external microphone to a second gain adjustment module, and sum respective outputs of the first gain adjustment module and the second gain adjustment module.

16. The device of claim 11, wherein the one or more processors are further configured to determine the position of the talking participant based on machine learning-based face detection.

17. The device of claim 16, wherein the one or more processors are further configured to control the gain for the selected beam of the plurality of beams and the gain for the at least one external microphone based on the machine learning-based face detection.

18. One or more non-transitory computer readable storage media encoded with instructions that, when executed by a processor, cause the processor to:

operate a videoconference session with a videoconference endpoint that is configured to pick up audio via (i) a plurality of beams associated with a microphone array and (ii) at least one external microphone;

determine a position of a talking participant in the videoconference session;

determine a position of the at least one external microphone relative to the videoconference endpoint; and in response to the position of the talking participant being further away from the videoconference endpoint than a position of the at least one external microphone, control a mixer to reduce a gain applied to audio signals from a selected beam from the plurality of beams and to adjust a gain applied to audio signals from the at least one external microphone.

19. The one or more non-transitory computer readable storage media of claim 18, wherein the position of the at least one external microphone is closest to the videoconference endpoint among any other external microphones that are in communication with the videoconference endpoint.

20. The one or more non-transitory computer readable storage media of claim 18, wherein the instructions are configured to eliminate overlap between respective audio pick up zones of the selected beam of the plurality of beams and the at least one external microphone.

* * * * *